Patented Oct. 11, 1938

2,133,098

UNITED STATES PATENT OFFICE 2,133,098

ADHESIVE

Carl Iddings, Staten Island, N. Y., assignor to The Muralo Company, Inc., a corporation of New York No Drawing. Application August 30, 1935, Serial No. 38,665

5 Claims. (Cl. 134—23.9)

Adhesives of the type employed for affixing labels to commercial tin plate or cans, are known as tin pastes. A number of problems have been presented in connection with the production of a satisfactory tin paste, and while the various types now available have tended to overcome some one or more of the problems, each of them is open to serious objections.

The commonest method of preparing a tin paste is with glue, starch or dextrin as the adhesive agent and incorporating therewith a fairly substantial proportion of a strong alkali, such as borax or caustic soda. The alkali functions to etch the surface of the tin to produce sufficient roughness or tooth to permit adherence of the paste. The alkali also serves to saponify and remove the film of grease or oil, usually palm oil, which may have remained upon the surface of the tin from the manufacture of the can.

Such alkalis however, are irritating to the human skin and in some cases affect the colors which have been employed in printing the label.

The present invention proposes to overcome the disadvantages inherent to present tin pastes, by providing a product having excellent adhesive properties, free from alkali, and essentially neutral in reaction. It is accordingly not injurious to the skin nor corrosive to the tin surface to which it is applied.

The tin paste prepared in accordance with the present invention adheres well to any of the usual types of tin containers as well as tin plate, and has been found to be satisfactory on containers made from so called terne plate. It also serves as a good adhesive on containers which have been lacquered or lithographed.

Even where grease or palm oil remaining from the can manufacture is encountered the effectiveness of the present paste is not impaired. Ready application and firm adherence of the labels is realized even though the grease or oil be present in unusually large quantities.

The paste is not only compatible with various colors used in printing labels, but should it become applied to the outer surface of the label either by accident or intentionally, it will become almost invisible upon drying without marring the appearance of the labeled container.

Good keeping qualities also characterize the tin paste of this invention, and for use it requires the mere admixture of water to thin it to its application consistency.

The paste comprises a casein solution and an aqueous solution of a synthetic resin consisting essentially of sodium borophosphate. The casein solution is preferably stable, such as a solution and/or dispersion of casein produced with alkali metal and/or ammonium fluorides at elevated temperatures exceeding, say, 170° F. The casein solution will preferably contain about 18% casein by weight, and in most cases have its pH value adjusted to substantial neutrality.

The sodium borophosphate is an inorganic non-crystallizing resin or material having resinous properties, commercially available under the trade name "Stacol" in both solid and solution form. In solution form the product is known as "Stacol D" and has the following approximate composition:

| | Per cent |
|---|---|
| Sodium borophosphate | 50 |
| Glycerine | 6 |
| Water | 44 |

The resin is neutral in reaction and water soluble, and its solution is readily miscible with a casein solution and/or dispersion, without destroying the stability of such a casein composition.

It has been found that 10% of a solution of the sodium borophosphate having a composition substantially as that of "Stacol D" given above, together with 90% of a substantially neutral casein solution, results in a tin paste which is essentially neutral in reaction, its pH value preferably not exceeding 7.5, and having all of the other qualities desired. Where the casein solution was stable to start with, the finished paste will also be stable, since the resin addition does not impair the keeping qualities.

In use, it is only necessary to add sufficient water to the paste to bring it to a consistency that permits convenient application. The paste is preferably applied to the back of the labels after the latter have first been moistened. This pre-dampening insures uniform adhesion and prevents wrinkling, since a dry label tends to absorb moisture from the paste. It is also contemplated to use the labels dry however, and application of the paste to the tin instead of to the labels is likewise intended.

The use of the term "casein solution" in the appended claims, should be construed as a solution and/or dispersion of casein.

I claim:

1. A substantially neutral adhesive paste, especially useful on tin surfaces, comprising a casein solution and sodium borophosphate.

2. An adhesive paste, especially useful on tin surfaces, comprising a casein solution and sodium borophosphate and having a pH value not exceeding 7.5.

3. An adhesive paste, especially useful on tin surfaces, characterized by substantial neutrality and stability over long periods of time, comprising a casein solution and sodium borophosphate.

4. An adhesive paste, especially useful on tin surfaces, comprising approximately 90% of an aqueous solution of casein containing approximately 18% casein by weight and 10% of a solution having the approximate composition of 50% sodium borophosphate, 6% glycerine and 44% water.

5. A substantially neutral adhesive paste, especially useful on tin surfaces, comprising a stable casein dispersion in admixture with a water soluble inorganic amorphous borophosphate, wherein the proportion of casein exceeds that of borophosphate.

CARL IDDINGS.